July 9, 1940.　　　O. F. SHEPARD　　　2,207,166

ELEVATOR TRANSMISSION

Filed March 3, 1937

INVENTOR.
BY　Oscar F. Shepard

Wood & Wood　ATTORNEYS.

Patented July 9, 1940

2,207,166

UNITED STATES PATENT OFFICE 2,207,166

ELEVATOR TRANSMISSION

Oscar F. Shepard, Cincinnati, Ohio

Application March 3, 1937, Serial No. 128,818

1 Claim. (Cl. 254—170)

This invention relates to improvements in sprocket chain hoists for elevators.

An object of the invention is to employ one or a plurality of sprocket chains as a hoist for an elevator cab, the chain from the driving sprocket having an overrun end free or slack, eliminating the use of counter-weights. The chain is suitably guided in the driving sprocket to prevent it from climbing the sprocket or the slack end from adhering thereto.

Other objects and further advantages of the invention will be more fully apparent from a description of the accompanying drawing, in which.

Figure 1:
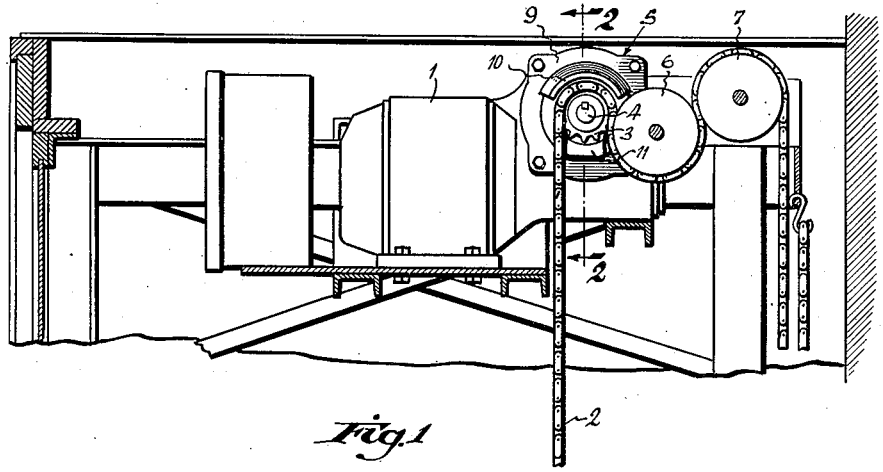
Figure 1 is a sectional view of the upper framework of an elevator hatchway, illustrating the transmission unit installed therein.
Figures 2, 3:
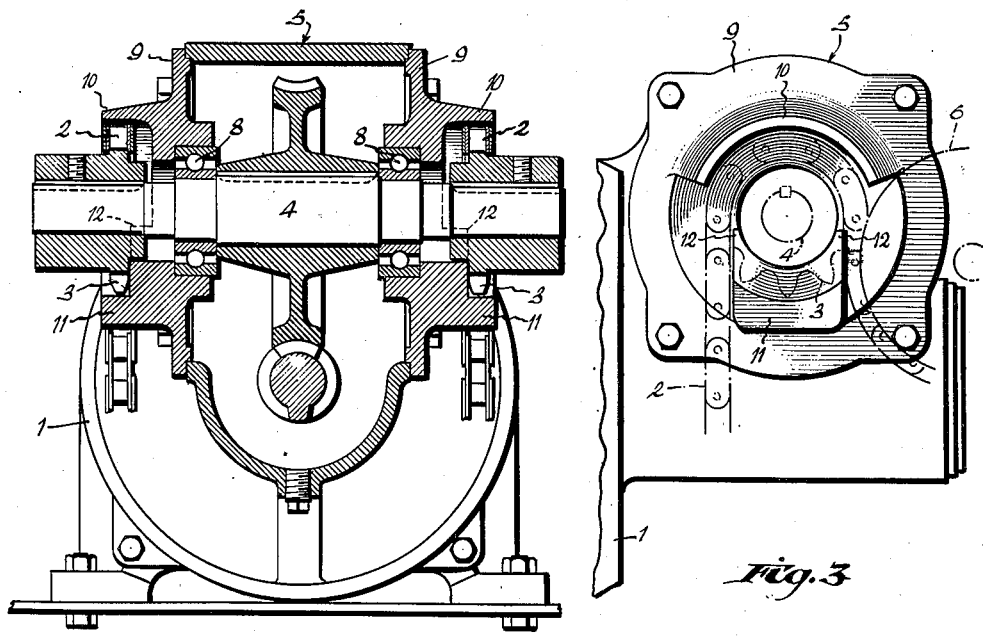
Figure 2 is a sectional view on line 2—2, Figure 1, detailing the structure of the transmission unit.
Figure 3 is an end view of the same with the driving sprocket and chain shown in dotted lines to more clearly illustrate the guiding arrangement in relation to the chain.

The present invention is a continuation-in-part of a copending application filed by me August 27, 1934, Serial No. 741,576, Patent Number 2,086,002, for Improvements in elevators. The elevator disclosed in said application is primarily adapted for installation in homes for two floor service and is motor driven by electric power taken from the regular house-lighting circuit.

To simplify the installation, provide for low cost of production and reduce maintenance service, hoisting chains are employed, preferably in the plural number, as a pair respectively engaged with sprockets fixed upon relative opposite ends of a drive shaft transmitted through reduction gearing by an electric motor.

The motor 1 and casing enclosed transmission, as a unit, is mounted within a suitable framework at an overhead location for suspendingly sustaining the elevator cab and translating the same. As the present invention is directed only to the means for guiding the sprocket chain hoist about a driving sprocket, which may be used other than for elevators, a detailed description of the elevator is herein omitted as reference may be had to the description thereof in the aforesaid copending application.

The cab hoist comprises a pair of sprocket chains 2—2 in parallel spaced arrangement, with one end fixed to the top of the framework of the cab. Each chain respectively is engaged over a sprocket wheel 3, relatively upon opposite ends of a driven shaft 4 journalled within bearings respectively fixed to opposite sides of a transmission casing 5.

The shaft 4 is driven by suitable reduction gearing connected with the motor shaft housed within the transmission casing 5, in general constituting a worm wheel fixed to the cross shaft 4, meshing with a worm wheel fixed to or a part of the armature shaft of the motor 1. As the mechanism for both chains is of duplicate construction, to avoid confusion the description will be confined to the singular.

The sprocket chain 2 loops about the sprocket wheel 3 and is in mesh with the teeth thereof, with the taut run or load sustaining end of the chain fixed to the top of the framework of the cab in a suitable manner. From the sprocket wheel the chain continues over a pair of circumferentially grooved idler wheels or sheaves 6—7, relatively progressively arranged and disposed at different elevations to direct a slack or non-load carrying end of the chain to the rear of the frame and into the space between the cab and building wall. The chain loops about the underside of the idler 6, adjacent the sprocket wheel 3, centering below the axis of the sprocket wheel to insure maximum tooth engagement with the sprocket wheel. Then it loops over the top of the idler wheel or sheaf 7 adjacent the idler wheel 6, set at a higher elevation for maximum chain contact with the peripheries of the idler wheels, the idlers tracking the chain to clear the car and assume a minimum head room. This permits the use of sprocket wheels and sprocket chains for hoisting elevator cabs, the chains having a top portion connecting with the cab, with an overrun end free or slack. The idlers are suitably journalled within bearings as a part of the supporting framework for the motor.

In the preferred construction the sprocket driving or cross shaft 4 is journalled within bearings 8, mounted within the opposite cap plates 9 of the motor transmission casing 5. Each cap plate, at its exterior side, is recessed to receive the sprocket wheel 3 and form an upper semi-circular flange 10 integral therewith, peripherally housing approximately the upper half of the sprocket wheel and the portion of the hoisting chain engaged thereabout. A lower guard 11 extends integrally from the cap plate below the cross shaft 4 and intermediate the loop of the chain about the sprocket. The guard 11 is of yoke form to provide a pair of limbs 12—12, straddling the cross shaft and lying adjacent the inner side of the sprocket wheel. The upper guard prevents the chain from climbing the sprocket or becoming disengaged therefrom, and the lower guard 11 prevents the slack end of the chain, which leads over the idlers, from adhering to the sprocket and wrapping under the taut portion of the chain, which would wedge the chain from the sprocket teeth. This dual method of guarding the chain is a decided safety factor and insures travel freedom under a maximum tooth chain intermesh, without possibility of clogging and use of a heavy lubricant to eliminate frequent oiling.

Having described my invention, I claim:

In a chain hoist, a casing, a shaft supported in said casing, an end plate for the casing, a sprocket fixed on the end of the shaft externally of the end plate, a flange on said end plate disposed concentrically with the shaft and overhanging the upper portion of the sprocket, a lug formed integrally with the end plate below the axis of the shaft, and providing side walls disposed substantially on vertical lines tangential to the base circle of the sprocket teeth, said lug providing a groove therein concentrically to the shaft axis and on the side of the lug toward the shaft whereby the chain is effectively held upon the sprocket from above and stripped from the sprocket at either side.

OSCAR F. SHEPARD.